(12) United States Patent
Winslow (10) Patent No.: US 8,826,384 B2
(45) Date of Patent: Sep. 2, 2014

(54) ASSENT TO CONDITIONS FOR NETWORK ACCESS

(75) Inventor: Richard Norman Winslow, Wilmington, DE (US)

(73) Assignee: L-3 Communications Corporation, New York, NY (US)

( * ) Notice: Subject to any disclaimer, the term of this patent is extended or adjusted under 35 U.S.C. 154(b) by 1386 days.

(21) Appl. No.: 11/777,384

(22) Filed: Jul. 13, 2007

(65) Prior Publication Data

US 2009/0019527 A1    Jan. 15, 2009

(51) Int. Cl.
*G06F 7/04* (2006.01)
*H04L 29/06* (2006.01)

(52) U.S. Cl.
CPC ............ *H04L 63/0272* (2013.01); *H04L 63/08* (2013.01); *H04L 63/0428* (2013.01); *H04L 63/30* (2013.01)
USPC ............... 726/4; 713/151; 713/153; 713/162; 713/192; 380/255

(58) Field of Classification Search
None
See application file for complete search history.

(56) References Cited

U.S. PATENT DOCUMENTS

| | | | |
|---|---|---|---|
| 4,368,357 A | | 1/1983 | Gurak |
| 5,249,230 A * | | 9/1993 | Mihm, Jr. ............... 380/249 |
| 7,296,291 B2 | | 11/2007 | Tahan |
| 7,483,984 B1 * | | 1/2009 | Jonker et al. ........... 709/226 |
| 7,743,403 B2 | | 6/2010 | McCarty |
| 7,930,732 B2 | | 4/2011 | Kumar et al. |
| 7,984,293 B2 * | | 7/2011 | Winslow ................. 713/162 |
| 7,992,010 B2 * | | 8/2011 | Dettinger et al. ....... 713/189 |
| 8,316,228 B2 * | | 11/2012 | Winslow ................. 713/153 |
| 2002/0078370 A1 | | 6/2002 | Tahan |
| 2003/0145329 A1 * | | 7/2003 | Candelore ............... 725/87 |
| 2004/0246514 A1 * | | 12/2004 | Clough et al. .......... 358/1.14 |
| 2005/0044350 A1 * | | 2/2005 | White et al. ............ 713/151 |
| 2007/0133762 A1 * | | 6/2007 | Berkman ................. 379/93.01 |
| 2008/0060065 A1 * | | 3/2008 | Wynn et al. ............ 726/5 |
| 2008/0235759 A1 | | 9/2008 | McCarty |
| 2009/0083548 A1 | | 3/2009 | Dettinger et al. |
| 2009/0217358 A1 | | 8/2009 | Kumar et al. |
| 2010/0154028 A1 | | 6/2010 | Wainner et al. |

FOREIGN PATENT DOCUMENTS

EP    1 580 934 A2    9/2005

OTHER PUBLICATIONS

Capulli, J. et al., "MUOS Communications Infrastructure Demonstration Network and Encryption-based Applications" Military Communications Conference, 2005, MILCOM 2005. IEEE Atlantic City, NJ, USA Oct. 17-20, 2005, Piscataway, NJ, pp. 1-5, XP010901642.
Hawk, J., "Wireless Warriors Secure in Their Knowledge", *SIGNAL Magazine*, 2005, http://www.afcea.org, 4 pages.
Harris® Assured Communications™, "Secure Wireless Local Area Network", SecNet® Plus PC Card, 2006, 2 pages.

* cited by examiner

*Primary Examiner* — Kaveh Abrishamkar
(74) *Attorney, Agent, or Firm* — Condo Roccia Koptiw LLP (57) ABSTRACT

A device that includes a first processor, a second processor, and an encryption module in communication with the first processor and the second processor may be used to accept conditions for access to the network. The first processor may receive condition data, and in response, may send an acceptance signal via the encryption module to the second processor. The second processor may receive the acceptance signal and, in response, may send acceptance data to a gatekeeper. The encryption module may block unencrypted data other than the acceptance signal from being communicated from the first processor to the second processor. The encryption module may support type 1 encryption.

33 Claims, 4 Drawing Sheets

ASSENT TO CONDITIONS FOR NETWORK ACCESS

GOVERNMENT SUPPORT

The present invention was supported by the National Security Agency under Contract Numbers MDA-904-02-C-1152 and CCEP-056-04. The government may have certain rights in the invention.

BACKGROUND

Network access providers often present terms and conditions that a user must accept prior to gaining access to a network. For example, a user may wish to connect to a Wireless Fidelity (Wi-Fi) hot spot or an Ethernet access point. Initially the user may request a webpage via Hyper Text Transport Protocol (HTTP). Instead of providing the requested webpage, the network access provider may respond with a "terms and conditions" webpage that presents the requirements for accessing the network. The requirements may include clicking a checkbox that indicates that the user agrees to the terms and conditions and clicking a submit button to send the data to the network access provider. The requirement may include payment of a service fee or provision of a username/password combination. Once the user has satisfied the requirements, the network access provider may allow subsequent access to the network.

This process presents a problem to users that wish to access a virtual private network (VPN) via the network access provider. The VPN may follow a security policy that does not allow for the initial insecure transaction with the network service provider. For example, the user's VPN software or hardware may not provide a by-pass mode that allows the transfer of the unencrypted data necessary to meet the requirements of the terms and conditions.

For example, the user's device may be a Type 1 product. A Type 1 product may include cryptographic equipment, assemblies or components classified or certified by the National Security Agency (NSA) for encrypting and decrypting classified and sensitive national security information. Generally, type 1 products may be used to protect systems requiring the most stringent protection mechanisms. To securely accept the terms and conditions, the user may have to first boot with an unclassified hard drive, accept the terms and conditions, shutdown the device, and then reboot with the classified hard drive to connect to the VPN. This cumbersome technique is inefficient because it requires booting the device more than once and physically swapping computer hardware. Moreover, the technique may be completely ineffective if the user does not have the unclassified hard drive available. Thus, there is a need for an efficient way to accept terms and conditions presented by network access providers while maintaining a defined security policy.

SUMMARY

Access to a network to establish a virtual private network may be conditional. The conditions may be defined by condition data generated by a gatekeeper of the network. Use of the network may be allowed upon acceptance of the conditions. The acceptance may be defined by receipt of acceptance data at the gatekeeper.

A device that includes a first processor, a second processor, and an encryption module in communication with the first processor and the second processor may be used to accept conditions for access to the network. The first processor may receive condition data. The condition data may require any one of an assent to terms, a name, an address, a username/password combination, and data indicative of a payment account. In response to the condition data the first processor may send an acceptance signal via the encryption module to the second processor. The second processor may receive the acceptance signal and, in response, send acceptance data to the gatekeeper. The second processor may be in communication with a datastore that contains profile data. The acceptance data may be based on the stored profile data. The encryption module may block unencrypted data other than the acceptance signal from being communicated from the first processor to the second processor. The encryption module may support type 1 encryption.

DETAILED DESCRIPTION

Figure 1:
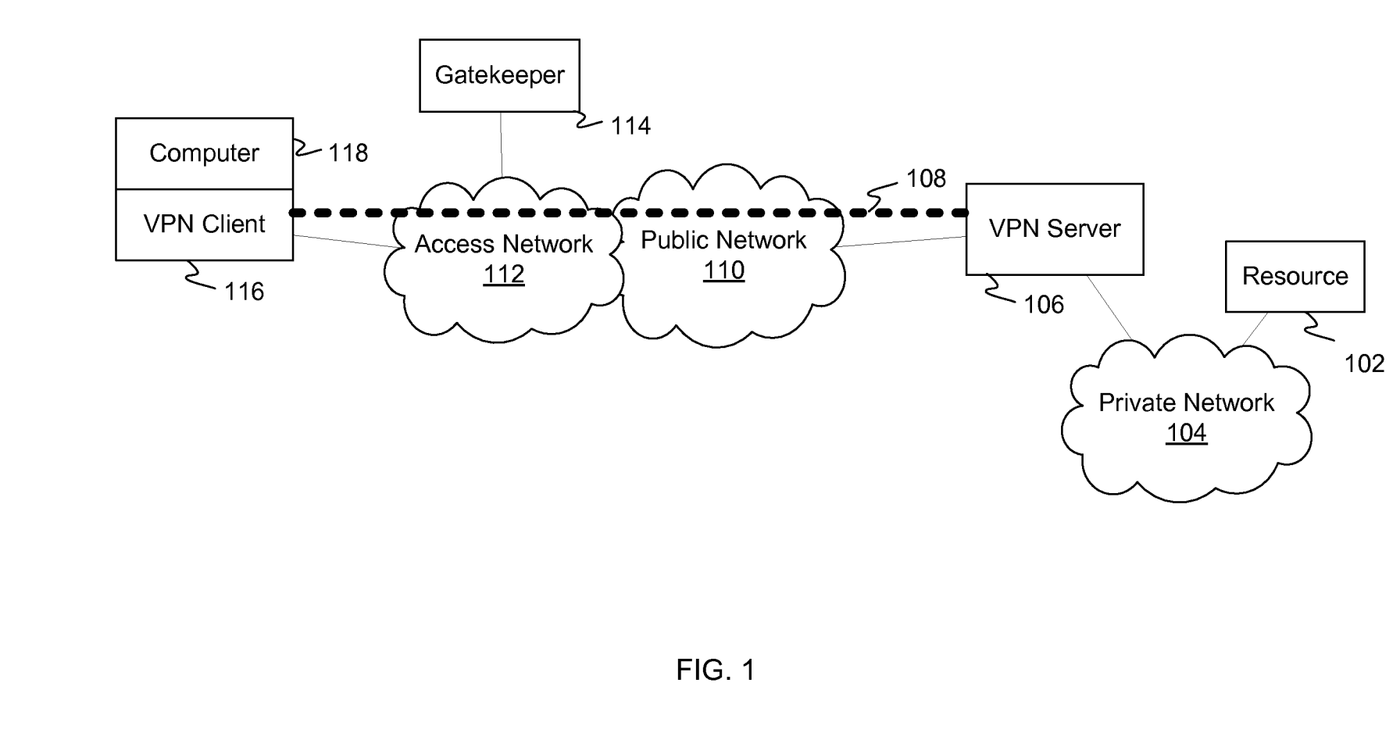
FIG. 1 depicts an example operating environment.

FIG. 1 depicts an exemplary operating environment. A user or application of a computer 118 may wish to access a resource 102 located on a private network 104 via a virtual private network (VPN) 108. The resource 102 may be any information system for the collection, storage, processing, maintenance, use, sharing, dissemination, disposition, display, or transmission of information. For example, the resource 102 may include a database, an intranet web-server, an application server, a network hard-drive, a storage area network (SAN), an e-mail server, and the like.

The resource 102 may be in communication with the private network 104. The private network 104 may be a local area network (LAN), a metropolitan area network (MAN), a wide area network (WAN), a wireless LAN (WLAN), and the like. Access to and use of the private network 104 may be restricted to authorized users. For example, the private network 104 may be administered by a private organization or a public entity, such as a government agency. Also for example, the private network 104 may support the transfer of classified or sensitive information.

A VPN server 106 may be in communication with the private network 104. The VPN server 106 may provide a gateway between the VPN 108 and the private network 104. The VPN server 106 may be in communication with a public network 110. The public network 110 may be any system, subsystem, or component suitable for transferring data. The public network 110 may be the internet, core network service provider, wide area network, and the like. The VPN server 106 may include security policies that may define the characteristics of the VPN 108. The VPN server 106 may be in communication with a VPN client 116 to establish the VPN 108.

The VPN 108 may be a secure connection established between a VPN client 116 and the VPN server 106. The VPN 108 may enable secure communication between the computer 118 and the resource 102. In one embodiment, the VPN 108 may define a information systems link utilizing tunneling, security controls, and endpoint address translation that may give the impression of a dedicated line. In one embodiment, the VPN 108 may use security protocols to provide confidentiality, authentication, and data integrity. For example, the security protocols may include IP security (JPsec) protocol, Secure Sockets Layer Transport Layer Security (SSL/TLS), OpenVPN, Point-to-point tunneling protocol (PPTP), and the like. The security protocol may include tunneling that encapsulates the data communicated between the VPN server 106 and the VPN client 116.

The VPN client 116 may access the public network 110 via an access network 112. The access network 112 may provide communications between the VPN client 116 and the public network 110 for communications to the VPN server 106. Like the public network 110, the access network 112 may be any system, subsystem, or component suitable for transferring data. For example, the access network 112 may be wired or wireless. The access network 112 may be a LAN, MAN, WAN, WLAN, Global System for Mobile Communications (GSM), personal area network (PAN), dial-up modem access, and the like. The access network 112 may employ network technologies such as Ethernet, WiFi, Bluetooth, and the like. The access network 112 may be administered by an administrator. For example, the access network 112 may be administered by a hotel, a business center, an airport, a public library, a network service provider, a coffee shop, and the like.

The administrator may define an access policy related to the access network 112. The access policy may include one or more conditions for access. In one embodiment, the conditions for access may require that a user of the access network 112 assent to legal terms and conditions. For example, the legal terms and conditions may provide a description of the network 304 access service to be provided; general use restrictions, details about charges, billing, and payment; a statement of the operational limits of the service; a statement regarding registration, customer information, and password security; a third-party content disclaimer; a disclaimer of warranties; a statement of limited liability; a statement concerning local laws and export controls, contractual clauses such as choice of law, force majeure, and severability; an acceptable use policy; a statement regarding trademarks; digital millennium copyright notices; contact information; and the like.

In one embodiment, the conditions for access may require that the user create an account with the administrator and provide payment for use of the access network 112. For example, the conditions may require a username/password combination that corresponds to an existing account. Also for example, the conditions may require a form of payment such as a credit card account, deposit account, escrow account, and the like. Also for example, the conditions may require some identification or demographic information from the user, such as a name, address, room number, birth date, e-mail address, and the like.

The access policy may be enforced by a gatekeeper 114. The gatekeeper 114 may grant or deny the availability of the access network 112 to a user in accordance with the access policy. The gatekeeper 114 may be a computer, server, router, network appliance, and the like. The gatekeeper 114 may provide authorization and network 304 access functions associated with the access network 112. In one embodiment, the gatekeeper 114 may include a web server that redirects an initial Hyper Text Transport Protocol (HTTP) request. The gatekeeper 114 may provide an entry webpage that presents the conditions for access. Once the user has satisfied the conditions, the gatekeeper 114 may allow use of the access network 112.

To illustrate, the user of the computer 118 may be in a hotel and may wish to use the LAN owned and administered by the hotel to establish a VPN 108 between the VPN client 116 and the VPN server 106. When the user connects to the hotel's LAN, the gatekeeper 114 may present the user with a webpage that includes the hotel's terms and conditions of use associated with the access network 112. The user may assent to these terms and conditions before being granted access to the access network 112. For example, the user may submit a form in connection with the webpage to the gatekeeper 114. The gatekeeper 114 may determine that the user's submission satisfies the conditions and may allow the computer 118 to communicate with the access network 112. Via the access network 112, the VPN client 116 may establish a VPN 108 between the VPN client 116 and the VPN server 106.

Figure 2:
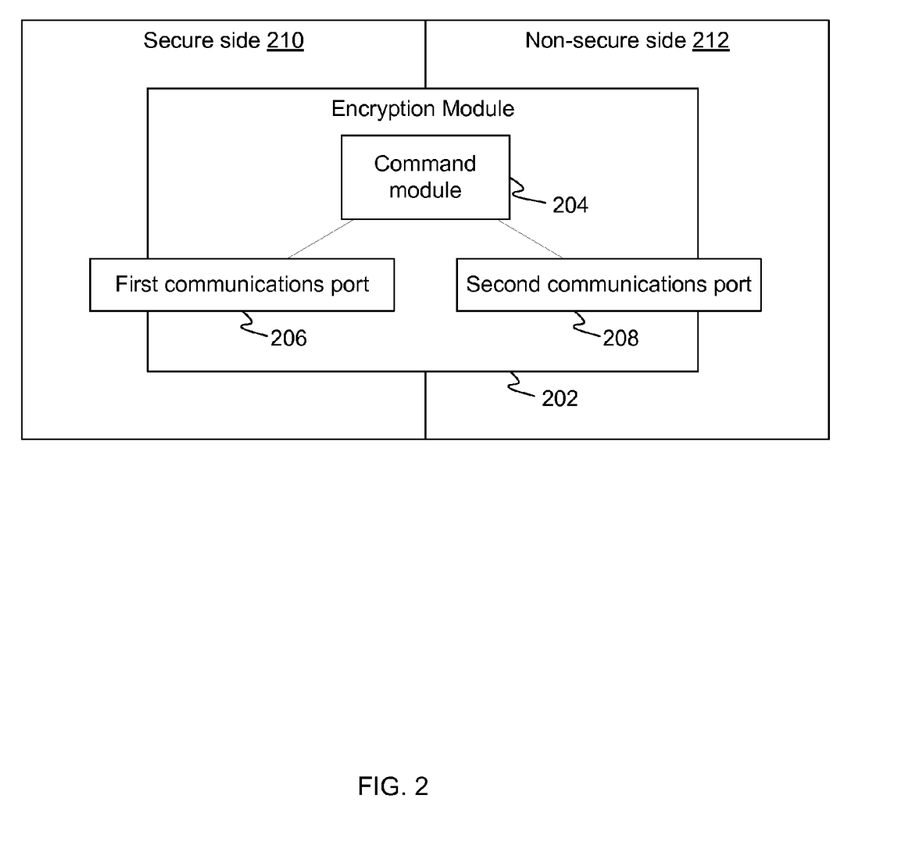
FIG. 2 depicts a block diagram of an example encryption module.

FIG. 2 depicts a block diagram of an exemplary encryption module 202. The VPN client 116 may include an encryption module 202. The encryption module 202 may define a demarcation between a secure side 210 and a non-secure side 212. The encryption module 202 may include a first communications port 206 and a second communications port 208. The first communications port 206 may be in communication with a command module 204, and the second communications port 208 may be in communication with the command module 204. The first communications port 206 may be associated with a secure side 210 of the encryption module 202, and the second communications port 208 may be associated with the non-secure side 212 of the encryption module 202.

In a classified environment, the secure side 210 may be may be known as the red side, and the non-secure side 212 may be known as the black side. The red designation may apply to systems, devices, areas, circuits, components, equipment, and the like in which unencrypted national security information is being processed. The black designation may apply to systems, devices, areas, circuits, components, equipment, and the like in which national security information is encrypted or is not processed.

User data originating on the secure side 210 of the encryption module 202 may pass to the non-secure side 212 in an encrypted form. Encrypted and unencrypted user data originating on the non-secure side 212 of the encryption module 202 may pass to the secure side 210 of the encryption module 202. Thus, the information stored in connection with the computer's operating system (i.e. in communication with the secure side 210, See FIG. 3) may be prevented from disclosure in an unencrypted form.

When assenting to terms and conditions presented by the gatekeeper 114, the command module 204 may pass the unencrypted data relating to the terms and conditions from the second communications port 208 to the first communications port 206. While the command module 204 blocks unencrypted data from being communicated from the first communications port 206 to the second communications port 208; the encryption module 202 may pass an acceptance signal from the first communications port 206 to the second communications port 208 that indicates assent to the conditions represented by the condition data.

In one embodiment, the acceptance signal may be predefined and distinguishable from user data. The acceptance signal may be predefined to indicate assent to terms and conditions. In one embodiment, the acceptance signal may be a hardware coded signal. For example, the acceptance signal may be represented by an electrical signal at port designated for the purpose of transmitting the acceptance signal. In one embodiment, the information capacity of the acceptance signal may be limited to assent of the conditions represented by the condition data. For example, the potential amount of information the acceptance signal may represent may be limited to assent of the conditions.

Once the VPN 108 connection is established between the encryption module 202 and the VPN server 106, information associated with the secure side 210 may pass through the encryption module 202, via the VPN 108, to the VPN server 106. Encrypted data may pass from the secure side 210 to the non-secure side 212 via the encryption module 202. Likewise, unencrypted data originating at or behind the VPN server 106 may pass via the VPN 108 and the encryption module 202 from the non-secure side 212 to the secure side 210.

Figure 3:
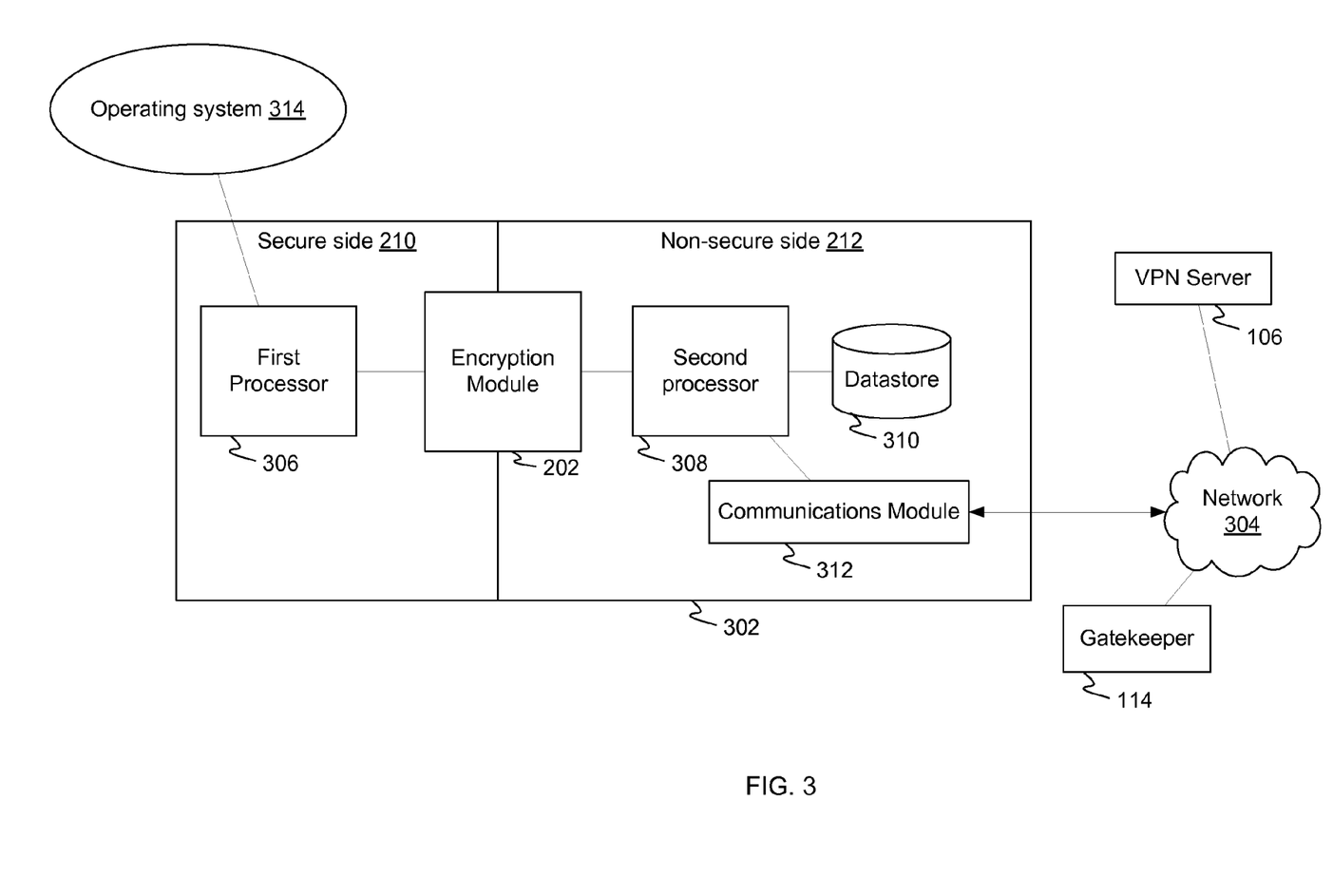
FIG. 3 depicts a block diagram of an example device for accepting conditions of network access.

FIG. 3 depicts a block diagram of an exemplary device 302 for accepting conditions for access to a network 304. The device 302 establish a VPN 108 between the device 302 and the VPN server 106 through one or more networks. The device 302 may be implemented in hardware or software connectable to a user's computer 118. For example, the user may have a computer 118 and the device 302 may be a Personal Computer Memory Card International Association (PCMCIA) device 302, Bluetooth device, universal serial bus (USB) device 302, and the like.

A first processor 306 and a second processor 308 may be in communication with the encryption module 202. In one embodiment, the encryption module 202 may define a demarcation between a secure side 210 and a non-secure side 212 of the device 302. For example, the non-secure side 212 may include the second processor 308, a datastore 310, and a communications module 312. Also for example, the secure side 210 may include the first processor 306. The first processor 306 and the second processor 308 may be any programmable digital electronic component. For example, the first processor 306 and second processor 308 may be microprocessors, digital signal processors, application-specific integrated circuits, and the like.

The encryption module 202 may be any component, system, or subsystem suitable for enforcing data transfer rules and establishing a secure connection with the VPN server 106. For example, the encryption module 202 may implement an IP Sec connection with the VPN server 106. Also for example, the encryption module 202 may be a type 1 encryption device. The encryption module 202 may generate keys used to encrypt data sent between the encryption module 202 and the VPN server 106. When establishing a VPN 108 between the device 302 and the VPN server 106, the encryption module 202 may coordinate the VPN 108 with the VPN server 106 via the second processor 308, the communications module 312, and the network 304.

The encryption module 202 may include a data channel and a command channel. The command channel may manage data flow between the first processor 306 and second processor 308. The command channel may enforce data transfer rules. For example, the command channel may block unencrypted data from being transported from the first processor 306 to second processor 308. The data channel may provide an input/output interface between the encryption module 202 and the first processor 306 and an input/output interface between encryption module 202 in the second processor 308. The data channel may provide one or more buffers at which unencrypted data may be encrypted and at which encrypted data may be unencrypted.

The device 302 may include a communications module 312 in communication with the second processor 308. The communications module 312 may enable data communications between the device 302 and the network 304. The communications module 312 may include an IEEE 802.11x Wireless adapter, an Ethernet adapter, a Bluetooth adapter, a modem, a mobile wireless adapter, and the like.

The device 302 may include a datastore 310 in communication with the second processor 308. The datastore 310 may be any component, system, or subsystem suitable for storing data. In one embodiment, the datastore 310 may be volatile memory such as random access memory (RAM). In one embodiment, the datastore 310 may be nonvolatile memory, such as read-only memory (ROM), flash memory, magnetic storage, and the like. The datastore 310 may store information related to the conditions required for accessing the network 304. For example, the data store may include a username/password combination, credit card information, address information, and the like. Information stored in the datastore 310 may be retrieved by the second processor 308. Information stored in the datastore 310 may include metadata. The metadata may include information describing information stored in the datastore 310. For example, the datastore 310 may include more than one username/password combination, and for each username/password combination, the metadata may indicate which gatekeeper 114 to which a username/password combination relates.

The device 302 may communicate with a computer operating system 314 though the first processor 306. The operating system 314 may include a secure mode and a non-secure mode. For example, when the computer 118 is booted with a classified hard drive, the operating system 314 may be in a secure mode. When the computer 118 is booted with an unclassified hard drive, the operating system 314 may be in a non-secure mode. The second processor 308 may communicate with the operating system 314 via the encryption module 202 and the first processor 306. In one embodiment, the second processor 308 may communicate with the operating system 314 only via the encryption module 202 and first processor 306. For example, when the operating system 314 is in a secure mode, the second processor 308 may only communicate with the operating system 314 via the encryption module 202 and the first processor 306.

Figure 4:
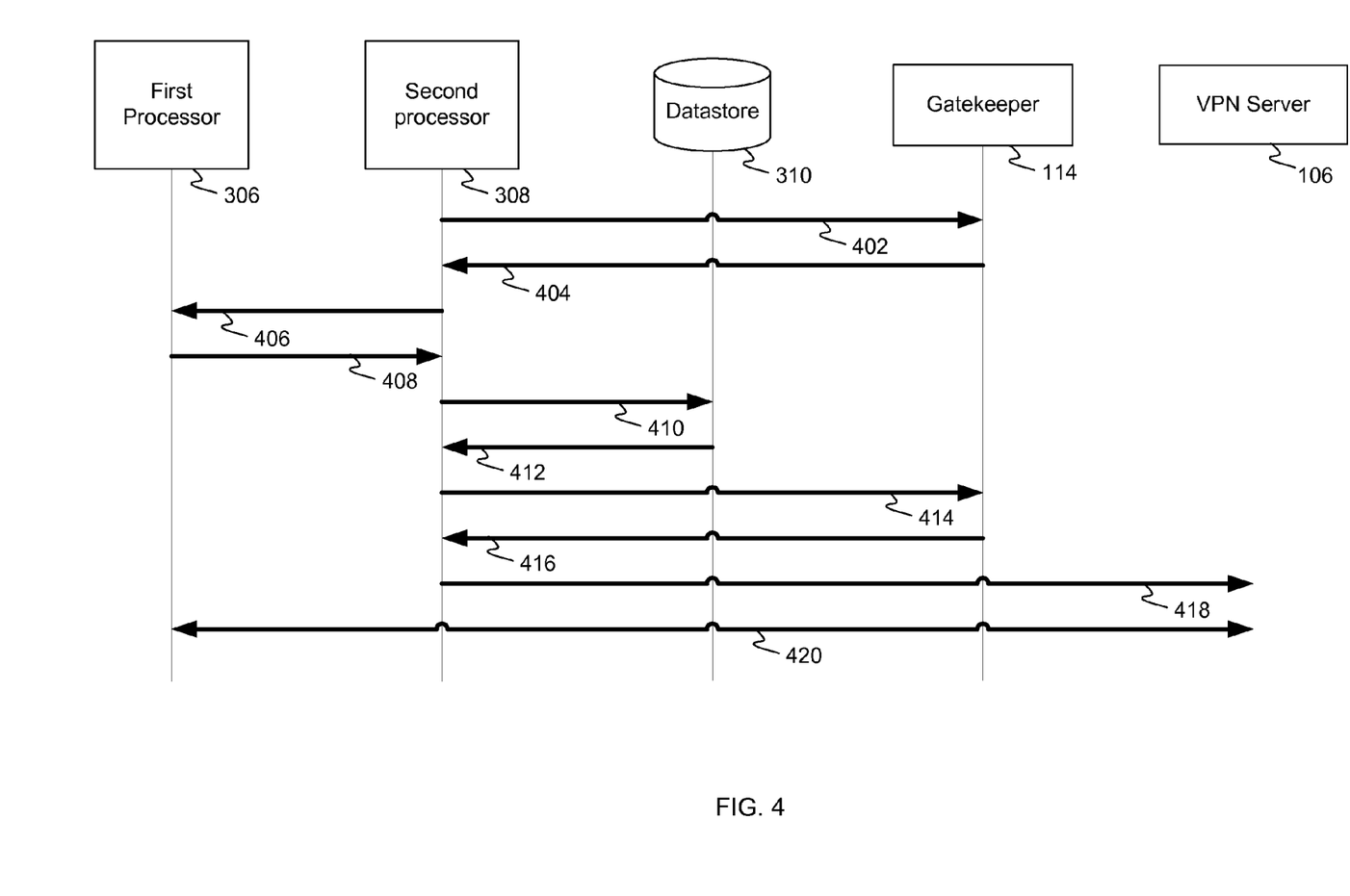
FIG. 4 depicts a protocol flow diagram of an example method for accepting conditions of network access.

FIG. 4 depicts a protocol flow diagram of an exemplary method for accepting conditions of network 304 access. At 402, the user may initiate a VPN 108 connection to the VPN server 106. The second processor 308, via the communications module 312, may attempt to use the network 304 to reach the VPN server 106. The request may be redirected to the gatekeeper 114 to grant or deny access to the network 304.

The second processor may trigger the redirection. For example, some gatekeepers may require an hypertext transfer protocol session to trigger the redirection. For example, an initial IPSec and/or HAIPE session, that may communicate first in a key exchange, such as ISAKMP/IKE (Internet Security Association and Key Management Protocol/Internet Key Exchange), may not be redirected to the gatekeeper. The second processor may initiate a hypertext transfer protocol session to trigger the redirection. The second processor may initiate a dummy hypertext transfer protocol session, which may not be directed by the user, for the purpose of triggering the redirection. The dummy hypertext transfer protocol session may be a throwaway session that is not maintained after the redirection has been triggered.

At 404, the gatekeeper 114 may send to the device 302 terms and conditions to access the network 304. The conditions to access the network 304 may be represented by condition data. Condition data may include legal terms and conditions, a prompt to indicate assent, a prompt to indicate a username/password combination, a prompt to indicate credit card information, a prompt to indicate a room number associated, or any other information pertinent to a user accessing the network 304.

At 406, in response to receiving the condition data, the second processor 308 may send the condition data to the first processor 306. The encryption module 202 may allow unencrypted data to pass from the non-secure side 212 to the secure side 210. The first processor 306 may present the condition data in a human-readable format to the user. The user may indicate acceptance of the condition data.

At 408, the first processor 306 may send an acceptance signal to the second processor 308. Since the encryption module 202 may block unencrypted data from being communicated from the secure side 210 to the non-secure side 212, information in addition to the acceptance signal may be blocked by the encryption module 202. For example, the user may wish to enter new credit card information; however, such unencrypted information may be blocked by the encryption module 202.

Responsive to the acceptance signal, the second processor 308 may parse the condition data to identify the conditions and the information required to accept the conditions. In one embodiment, condition data may require acceptance of the legal terms and conditions of use of the network 304. For example, the condition data may include a webpage with a checkbox form field and a submit button. Upon receiving the acceptance signal, the second processor 308 may generate acceptance data that corresponds to a selection of the checkbox and a clicking of the submit button. For example, where the checkbox form field and submit button are implemented in Hyper Text Markup Language (HTML), the acceptance data may formatted as an HTTP Post request method.

In another embodiment, the condition data may be formatted in a specific protocol for this application. For example, the condition data may be embedded Extensible Markup Language (XML) data within a webpage. The associated XML tags may be predefined to facilitate interoperability between the gatekeeper 114 and the second processor 308.

Upon parsing the condition data, the second processor 308 may identify additional requirements for accepting the conditions described by the condition data. For example, the condition data may require a username/password combination. At 410, the second processor 308 may query the datastore 310 for the required information. The datastore 310 may have been previously loaded with the required information. For example, the user may have previously initiated the device 302 in a non-secure mode and loaded the required information to the datastore 310. For example, the user may boot with an unclassified hard drive. Once the computer 118 and the device 302 have been initiated in this non-secure mode, the user may enter profile information, name, address, credit card information and the like in the datastore 310, so that the information is available when in a secure mode.

At 412, the datastore 310 may return to the requested information, and the second processor 308 may generate acceptance data incorporating information retrieved from the datastore 310. For example, if the condition data requires payment for access to the network 304, the second processor 308 may formulate an appropriate response including credit card information retrieved from the datastore 310. Since the datastore 310 resides in the non-secure side 212 of the device 302, the unencrypted credit card information does not pass from the secure side 210 to the non-secure side 212 of the device 302 to reach the second processor 308.

At 414, the second processor 308 may send the acceptance data to the gatekeeper 114. In one embodiment, the second processor 308 may engage in one or more transactions with the gatekeeper 114. For example, the gatekeeper 114 may present condition data on multiple webpages, and the second processor 308 may respond to each of those webpages.

The gatekeeper 114 may process the acceptance data and determine if the acceptance data is sufficient for granting access to the network 304. At 416, the gatekeeper 114 may respond with a confirmation if the acceptance data is sufficient for granting access to the network 304. The gatekeeper 114 may respond with an error if acceptance data is insufficient. In one embodiment, the gatekeeper 114 may not respond other than to grant access to the network 304.

Granting access to the network 304 may include any network operation that allows the communications module 312 to establish a data connection via the network 304. For example, granting network access may include enabling routing for the device 302's IP address, enabling a proxy to forward the device 302's network 304 requests, granting a public IP address for the device 302, and the like.

Once access to the network 304 has been granted, at 418, the device 302 may initiate a secure transaction with the VPN server 106. In one embodiment, this request may be identical to that of step 402. In one embodiment, the second processor 308 may initiate the secure transaction. In one embodiment, the encryption module 202 may initiate the secure transaction.

At 420, a VPN 108 may be established between the device 302 and the VPN server 106. The VPN 108 may provide a secure, encrypted tunnel for data transfer between the first processor 306 and the VPN server 106. Once the VPN 108 has been established, encrypted data may pass from the secure side 210 to the non-secure side 212 of the encryption module 202.

What is claimed:

1. An encryption/decryption device comprising:
an encryption module configured to:
define a demarcation between a secure side of the encryption/decryption device and a non-secure side of the encryption/decryption device,
communicate with a first processor on the secure side of the encryption/decryption device, and
communicate with a second processor on the non-secure side of the encryption/decryption device;
the second processor configured to:
attempt to access a network,
receive condition data generated by a network gatekeeper, wherein the condition data indicates at least one network condition to be accepted in order to access the network, and
send the condition data to the first processor via the encryption module, wherein the condition data is sent to the second processor via the encryption module in an unencrypted form; and
the first processor configured to, in response to receiving the condition data, send an acceptance signal via the encryption module to the second processor, wherein the encryption module is configured to block unencrypted data other than the acceptance signal from being communicated from the first processor to the second processor; and
the second processor further configured to send acceptance data indicating acceptance of the at least one network condition to the network gatekeeper based on receiving the acceptance signal from the first processor via the encryption module.

2. The device of claim 1, wherein the second processor is configured to request access to the network and receive the condition data via hypertext transfer protocol.

3. The device of claim 2, wherein the condition data indicates at least one of an assent to terms, a name, an address, a username/password combination, or data indicative of a payment account.

4. The device of claim 2, wherein the condition data is formatted via extensible markup language.

5. The device of claim 1, wherein the second processor is configured to send the acceptance data via hypertext transfer protocol.

6. The device of claim 5, wherein the acceptance data comprises at least one of an assent to terms, a name, an address, a username/password combination, or data indicative of a payment account.

7. The device of claim 1, further comprising a local datastore in communication with the second processor, wherein the local data store is comprised in the non-secure side of the encryption/decryption device, the local datastore is configured to store profile data, and the acceptance data is based on the profile data.

8. The device of claim 1, wherein the encryption module comprises a data channel for passing data between the first processor and the second processor and a command channel for controlling the first processor and the second processor, wherein the second processor is configured to receive the acceptance signal via the command channel.

9. The device of claim 1, wherein the first processor is configured to send user data to the second processor via the encryption module, wherein the encryption module is configured to encrypt the user data, and wherein the acceptance signal is distinguishable from the user data.

10. The device of claim 1, wherein the acceptance signal is not encrypted.

11. The device of claim 1, wherein the encryption module is configured to support type 1 encryption.

12. An encryption module configured to define a demarcation between a secure side of an encryption/decryption device and a non-secure side of the encryption/decryption device, the encryption module comprising:
   a first communications port configured to communicate with a first processor on the secure side of the encryption/decryption device;
   a second communications port communicate with a second processor on the non-secure side of the encryption/decryption device; and
   a command module configured to:
      receive condition data generated by a network gatekeeper from the second processor via the second communication port, wherein the condition data indicates at least one network condition to be accepted in order to access a network,
      pass the condition data in an unencrypted form to the first processor via the first communications port,
      receive data being communicated from the first communications port to the second communications port including an unencrypted acceptance signal that indicates acceptance of the at least one network condition, and encrypt the data being communicated from the first communications port to the second communication port other than the acceptance signal.

13. The encryption module of claim 12, wherein the acceptance signal triggers the second processor to send acceptance data to the network gatekeeper of the network.

14. The encryption module of claim 13, wherein the conditions require at least one of an assent to terms, a name, an address, a username/password combination, or data indicative of a payment account.

15. The encryption module of claim 13, wherein the conditions are formatted via extensible markup language.

16. The encryption module of claim 13, wherein the second processor is configured to receive the acceptance signal from the second communication port and, responsive to receiving the acceptance signal, send acceptance data to the network gatekeeper, the acceptance data corresponding to an assent to the at least one network condition.

17. The encryption module of claim 16, wherein the acceptance data is sent via hypertext transfer protocol.

18. The encryption module of claim 17, wherein the acceptance data comprises at least one of an assent to terms, a name, an address, a username/password combination, or data indicative of a payment account.

19. The encryption module of claim 16, further comprising a datastore configured to store profile data, wherein the acceptance data is based on the profile data.

20. The encryption module of claim 12, wherein a data channel and a command channel each connect the first communications port and the second communication port and wherein the command module is configured to receive data being communicated from the first communication port to the second communication port and send data other than the acceptance signal via the data channel and the acceptance signal via the command channel.

21. The encryption module of claim 12, wherein the command module is configured to send encrypted second data to the second communications port and wherein the acceptance signal is distinguishable from the second data.

22. The encryption module of claim 21, wherein the command module is configured to decrypt user data being communicated from the second communication port to the first communication port.

23. The encryption module of claim 12, wherein the command module is configured to support type 1 encryption.

24. A method for accepting conditions of a first network, the method comprising:
   a second processor attempting to access a network;
   the second processor receiving condition data from a network gatekeeper based on attempting to access the network, wherein the second processor is comprised in a non-secure side of an encryption/decryption device, the condition data indicates at least one network condition to be accepted in order to access the network, and user data on the non-secure side of the encryption/decryption device is encrypted;
   the second processor sending the condition data in an unencrypted form to a first processor via an encryption module, wherein the first processor is comprised in a secure side of the encryption/decryption device, wherein user data on the secure side of the encryption/decryption device is unencrypted;
   the first processor sending an acceptance signal to the second processor via the encryption module based on determining that the at least one network condition is acceptable;
   the second processor sending acceptance data to the network gatekeeper for the network based on receiving the acceptance signal from the first processor via the encryption module; and
   the encryption module blocking unencrypted data other than the acceptance signal from being communicated from the first processor to the second processor.

25. The method of claim 24, wherein the first processor receives the condition data via hypertext transfer protocol.

26. The method of claim 25, wherein the condition data indicates at least one of an assent to terms, a name, an address, a username/password combination, or data indicative of a payment account.

27. The method of claim 25, wherein the condition data is formatted via extensible markup language.

28. The method of claim 24, wherein the second processor sends the acceptance data via hypertext transfer protocol.

29. The method of claim 28, wherein the acceptance data comprises at least one of an assent to terms, a name, an address, a username/password combination, or data indicative of a payment account.

30. The method of claim 24, further comprising retrieving profile data from a datastore in communication with the second processor, wherein the acceptance data is based on the profile data.

31. The method of claim 24 further comprising sending encrypted user data from the first processor to the second processor via an encryption module, wherein the acceptance signal is distinguishable from the encrypted user data.

32. The method of claim 31, wherein the acceptance signal is not encrypted.

33. The method of claim 24, further comprising initiating a dummy hypertext transfer protocol session prior to the receiving condition data.

* * * * *